United States Patent
Miskovic et al.

(10) Patent No.: US 10,864,786 B2
(45) Date of Patent: Dec. 15, 2020

(54) HIGHFLOW AIR COUPLING DEVICE AND SYSTEM

(71) Applicants: Steven E. Miskovic, Chicago, IL (US); Abelardo Afable, Chicago, IL (US); Karolina Stus, Chicago, IL (US)

(72) Inventors: Steven E. Miskovic, Chicago, IL (US); Abelardo Afable, Chicago, IL (US); Karolina Stus, Chicago, IL (US)

(73) Assignee: Milton Industries, P.C., Chicago, IL (US)

( * ) Notice: Subject to any disclaimer, the term of this patent is extended or adjusted under 35 U.S.C. 154(b) by 85 days.

(21) Appl. No.: 16/178,644

(22) Filed: Nov. 2, 2018

(65) Prior Publication Data
US 2019/0135057 A1   May 9, 2019

Related U.S. Application Data

(60) Provisional application No. 62/581,560, filed on Nov. 3, 2017.

(51) Int. Cl.
  *B60C 29/00* (2006.01)
  *B60C 29/06* (2006.01)
  *F16K 15/20* (2006.01)

(52) U.S. Cl.
  CPC .......... *B60C 29/002* (2013.01); *B60C 29/005* (2013.01); *B60C 29/06* (2013.01); *F16K 15/20* (2013.01)

(58) Field of Classification Search
  CPC .................................. Y10T 137/6089
  USPC .......................................... 251/304
  See application file for complete search history.

(56) References Cited

U.S. PATENT DOCUMENTS

| | | | | | |
|---|---|---|---|---|---|
| 3,788,603 | A | * | 1/1974 | Snider | F16K 3/26 251/345 |
| 4,924,926 | A | * | 5/1990 | Schultz | B60C 23/003 152/417 |
| 5,255,715 | A | * | 10/1993 | Phillips | B23C 1/00 137/625.23 |
| 5,901,749 | A | * | 5/1999 | Watson | F16K 11/048 137/625.27 |
| 9,296,264 | B2 | * | 3/2016 | Mozingo | B60C 23/003 |
| 2013/0075642 | A1 | * | 3/2013 | Hervieux | F15B 13/0406 251/304 |
| 2017/0204983 | A1 | * | 7/2017 | Sidders | F16K 11/048 |

* cited by examiner

*Primary Examiner* — Kevin R Barss
(74) *Attorney, Agent, or Firm* — Justin Lampel (57) ABSTRACT

A highflow air coupling system is provided. The highflow air coupling system has a valve chamber housing having a plurality of openings including a user serviceable port and a reversible air flow valve. The interior of the valve chamber housing has a multi-tiered main valve with multiple large holes located on multiple levels. A unique exterior grip of the housing allows for easy grasping of the housing chamber. The device and system are especially suitable for use with, for example, inflating tires, especially in a military environment.

4 Claims, 7 Drawing Sheets

HIGHFLOW AIR COUPLING DEVICE AND SYSTEM

CROSS-REFERENCE TO RELATED APPLICATIONS

The following application is based on and claims the priority benefit of U.S. provisional application Ser. No. 62/581,560 filed Nov. 3, 2017 currently; the entire contents of which are incorporated by reference.

BACKGROUND OF THE INVENTION

A highflow air coupling device and system is provided. The highflow air coupling system has a valve chamber housing having a plurality of openings including a user serviceable port and a reversible air flow valve. The interior of the valve chamber housing has a multi-tiered main valve with multiple large holes located on multiple levels. A unique exterior grip of the housing allows for easy grasping of the housing chamber. The device and system are especially suitable for use with, for example, inflating tires, especially in a military environment.

Over the years, attempts have been made to provide improved highflow air couplers. For example, U.S. Pat. No. 5,181,977 to Gneiding et al discloses a tire fill valve having a pressure relief and tire fill fluid gas flow limiting characteristics for use in filling tires to a predetermined pressure form a large flow capacity gas source delivering fill gas at a substantially greater pressure. Gases utilized typically are air or nitrogen. The valve of the invention is wheel mounted intermediate the gas pressurizing source and the tire gas valve inlet. Tire fill gas from a high pressure high capacity source passes through a flow limiting orifice having a positive closure or shutoff member and passes through a pressure sensitive chamber as it enters the tire. Chamber pressure is sensed by a spring loaded valve disk controlling relief or venting orifices. When fill pressure in the pressure sensing chamber exceeds a pre-determined value established by the valve disk area and valve disk springs, the disk lifts allowing the venting of the fill gas. Overpressurization of the pressure sensitive chamber and tire with the disk in its relief position is prevented by limited flow and/or positive shutoff through the chamber entrance or flow limiting orifice.

Further, U.S. Pat. No. 9,415,645 to Racine discloses a valve assembly for a central tire inflation system. The valve assembly includes a first housing having a first port connected to a second port via a cavity. The second port is in fluid communication with a wheel assembly. A biasing member is disposed in the cavity adjacent a first perforation formed in the first housing. A valve member is contacted by the biasing member. The valve member includes a first portion having an outer surface which is unbroken adjacent an end to allow a pressurized fluid to flow around it. The first portion reduces in diameter toward the end.

Still further, U.S. Pat. No. 9,302,556 to Cuny discloses an air maintenance tire and air pump assembly having a sidewall and a tire cavity for maintaining pressure; an elongate tubular air passageway enclosed within a flexing region of the sidewall, air passageway, the air passageway operably closing segment by segment in reaction to induced forces from the tire flexing region as the flexing region of the tire wall rotates adjacent a rolling tire footprint, the elongate air passageway having at least one check valve device seated within the axial air passageway; and a relief valve assembly comprising a chamber body, a valve, a piston, and a silicone ring, the valve having a valve body and a valve head, the valve head, deforming to release over-pressurized air from the tire cavity to atmosphere.

However, these patents fail to describe a highflow air coupling system having a housing with a main valve having multiple tiers as is described in the present application. A need, therefore, exists for an improved highflow coupling system.

SUMMARY OF THE INVENTION

A highflow air coupling device and system is provided. The highflow air coupling system has a valve chamber housing having a plurality of openings including a user serviceable port and a reversible air flow valve. The interior of the valve chamber housing has a multi-tiered main valve with multiple large holes located on multiple levels. A unique exterior grip of the housing allows for easy grasping of the housing chamber. The device and system are especially suitable for use with, for example, inflating tires, especially in a military environment.

An advantage of the present highflow air coupling system is that the present highflow air coupling system allows for the inflation of tires from a safe distance from the tires.

Yet another advantage of the present highflow air coupling system is that the present highflow air coupling system fits most, if not all, military vehicles.

Still another advantage of the present highflow air coupling system is that the present highflow air coupling system allows for the inflation of tires faster than typical inflator coupling systems.

And another advantage of the present highflow air coupling system is that the present highflow air coupling system has replaceable parts.

An advantage of the present highflow air coupling system is that the present highflow air coupling system reduces the visibility time for an enemy combatant to act while a user is inflating a tire.

For a more complete understanding of the above listed features and advantages of the present highflow air coupling system reference should be made to the detailed description and the detailed drawings. Further, additional features and advantages of the invention are described in, and will be apparent from, the detailed description of the preferred embodiments.

DETAILED DESCRIPTION OF THE PREFERRED EMBODIMENTS

A highflow air coupling device and system is provided. The highflow air coupling system has a valve chamber housing having a plurality of openings including a user serviceable port and a reversible air flow valve. The interior of the valve chamber housing has a multi-tiered main valve with multiple large holes located on multiple levels. A unique exterior grip of the housing allows for easy grasping of the housing chamber. The device and system are especially suitable for use with, for example, inflating tires, especially in a military environment.

Figure 1:
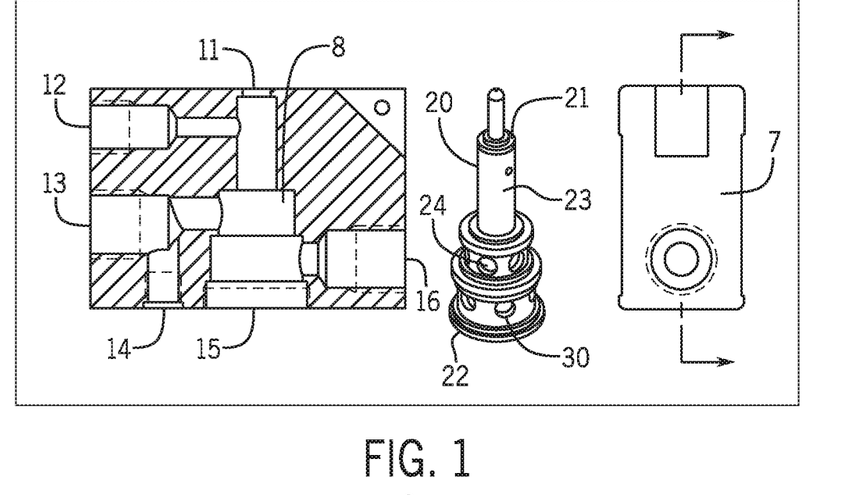
FIG. 1 illustrates an engineering drawing showing the valve chamber housing with a superimposed main valve in one embodiment.
Figure 2:
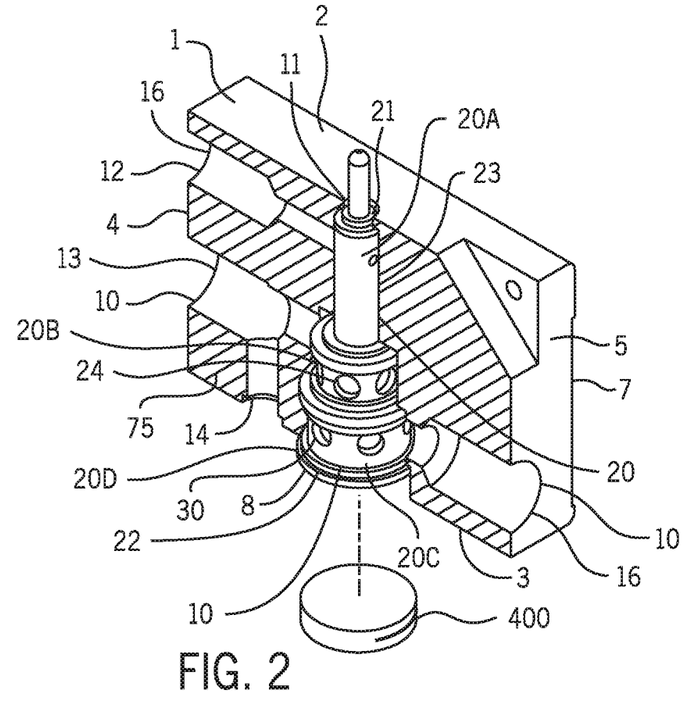
FIG. 2 illustrates a cross sectional view of the valve chamber housing in an embodiment (with the handle removed).

Referring first to FIG. 2, in an embodiment, the highflow air coupling system may have a housing 1 having a top 2, a bottom 3, a front 4, a back 5, a first side 6, a second side 7 and an interior 8. In an embodiment, the housing 1 is made from, for example, a metal or durable plastic so as to withstand harsh environmental conditions as well as high air pressures. FIG. 2 illustrates the housing 1 without the handle present.

The housing 1 may have a plurality of openings 10 which extend into the interior 8 of the housing 1. Although the exact location of the openings 10 may vary, in a preferred embodiment, the top 2 of the housing 1 may have a first opening 11, the front of the housing 1 may have a second opening 12 and a third opening 13 and the bottom 3 of the housing 1 may have a fourth opening 14 and a fifth opening 15 and the back 5 of the housing 1 may have a sixth opening 16.

Located within the interior 8 of the housing 1 may be a plurality of components. For example, the interior 8 may have a main valve 20 which extends from the top 2 (at the first opening 11) to the bottom 3 (the fifth opening 15) of the housing 1. During assembly of the housing, a screw 400 (FIG. 2) may then be inserted into the fifth opening 15 creating an air-tight seal on the bottom 3 of the housing 1 at the fifth opening 15. Thus, the screw 400 may secure the main valve 20 within the housing 1 after the main valve 20 is inserted through the fifth opening 15 of the housing. Preferably, the screw 400 is flat so as to not alter the flow of air 100 within the housing 1.

Figure 3:
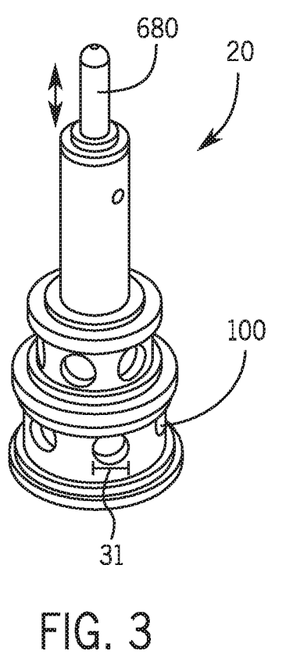
FIG. 3 illustrates a perspective view of the main valve of the device in an embodiment.
Figure 7:
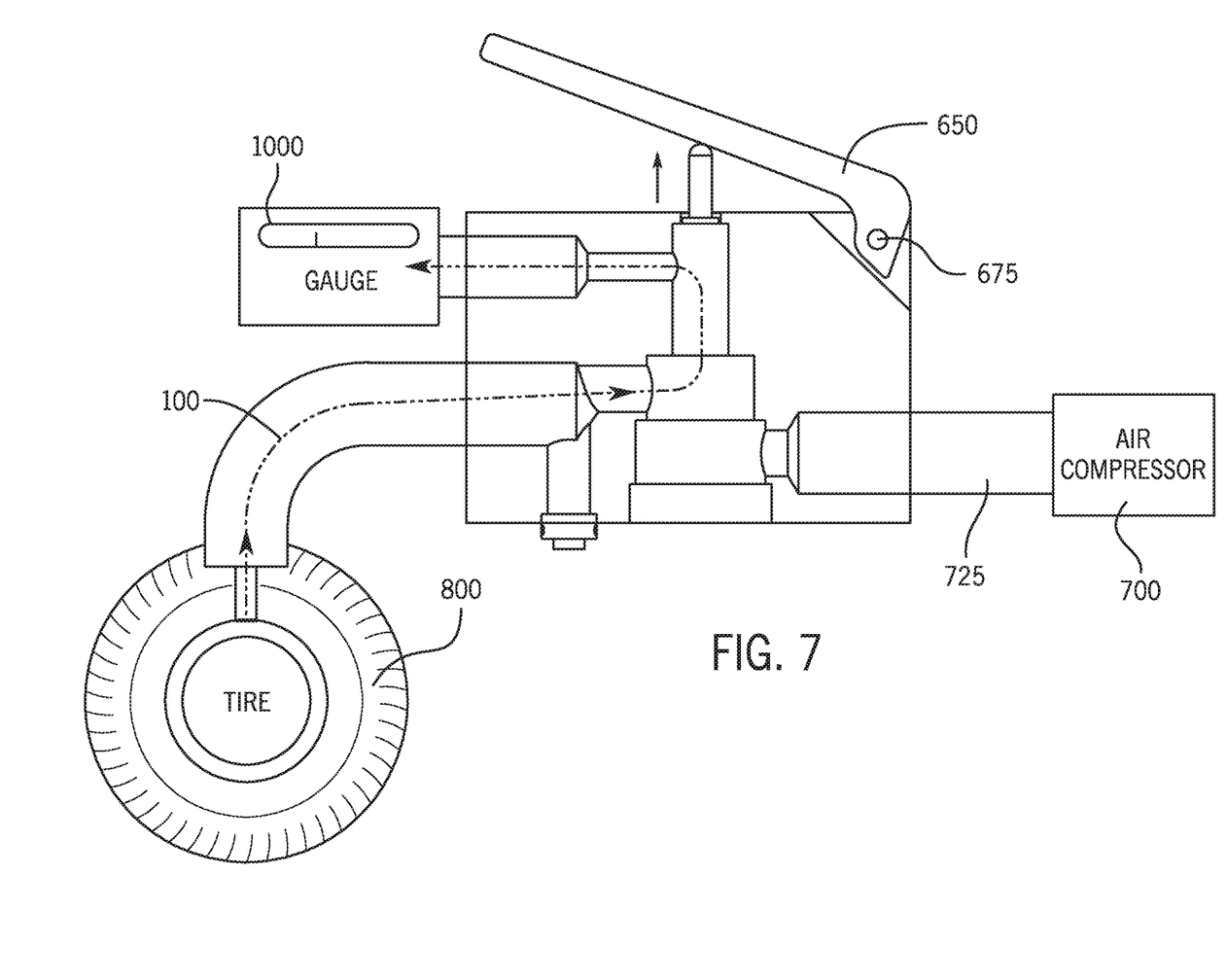
FIG. 7 illustrates the path of air through the housing in an embodiment wherein the activation handle is unpressed.
Figure 8:
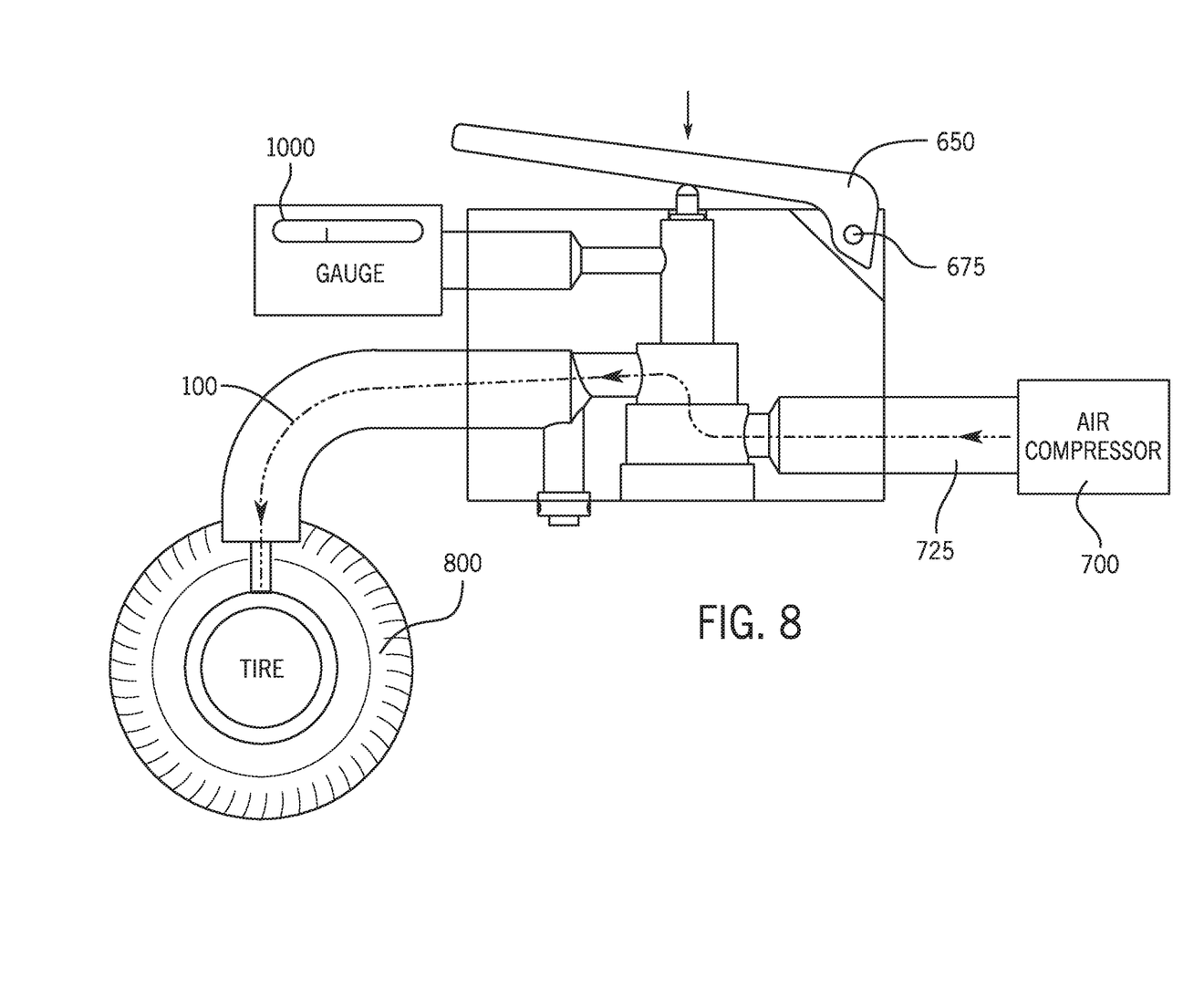
FIG. 8 illustrates the path of air through the housing in an embodiment wherein the activation handle is pressed.
Figure 9:
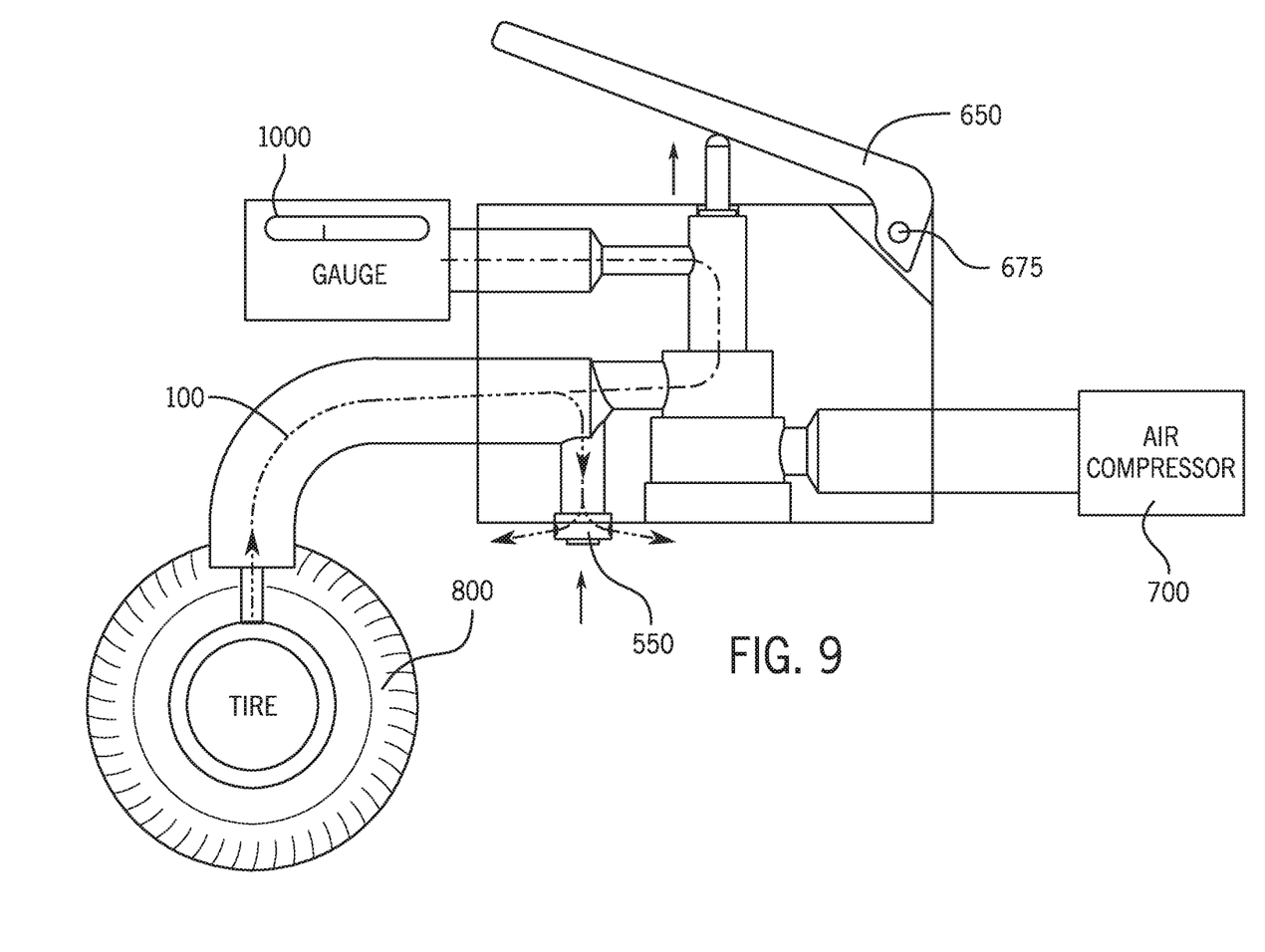
FIG. 9 illustrates the path of air through the housing in an embodiment wherein the activation handle is unpressed but wherein the reverse air flow valve is activated.

In an embodiment, the main valve 20 may have a top 21, a bottom 22, a generally cylindrical side 23 and an interior 24. The generally cylindrical side 23 may, in an embodiment, have multiple tiers (20A, 20B, 20C and 20D) wherein the top tier (located near the top 2 of the housing) of the main valve 20 has a smaller diameter than the bottom tiers (located near the bottom 3 of the housing). In an embodiment, the tiers increase in diameter as they get closer to the bottom 3 of the housing 1 so as to better improve air flow 100 through the housing 1. Located on at least two separated tiers may be a plurality of holes 30. The plurality of holes 30 may have a diameter 31 (FIG. 3) and may allow air 100 to flow initially from a compressor 700 (FIGS. 7-9), through a hose 725 then into the sixth opening 16 of, for example, the back 5 of the housing 1, and ultimately out to a tire 800 (FIGS. 7-9) or through the fourth opening 14 (the reverse air flow valve 550). The plurality of holes 30 allows air 100 to flow from within the interior of the valve 20 to outside the valve 20 and into, for example, a plurality of sealed chambers 900A, 900B (as discussed below).

Prior art main valves often have a single opening at the tier level. More specifically, tier 20B in the prior art would have a single opening as opposed to multiple large openings. The present device uses multiple holes 30 on tiers 20B and 20C to increase the amount of air 100 which may flow through the housing 1 at a given moment. As a result, a tire 800 may be inflated or deflated much quicker than normal prior art main valves.

In an embodiment, the main valve 20 may have a plurality of sealed chambers 900A, 900B (FIG. 10) which surround the tiers 20B, 20C; respectively. The sealed chambers 900A, 900B may allow the air 100 to flow out of the openings 30 on the tiers 20B, 20C and may direct the air 100 into the proper channel (to the tire 800 or a gauge 1000 for determining air pressure of the tire 800).

As stated above, the plurality of holes 30 may located on separated tiers. In an embodiment, the tiers may be separated by, for example, generally circular ridges having a gasket 750. The gasket (or seal) 750 may direct the flow of air through the proper tier. Further, the gasket 750 may prevent air flow 100 from one of the plurality of chambers 900A passing into a second sealed chamber 900B without passing through the main valve 20.

Figure 4:
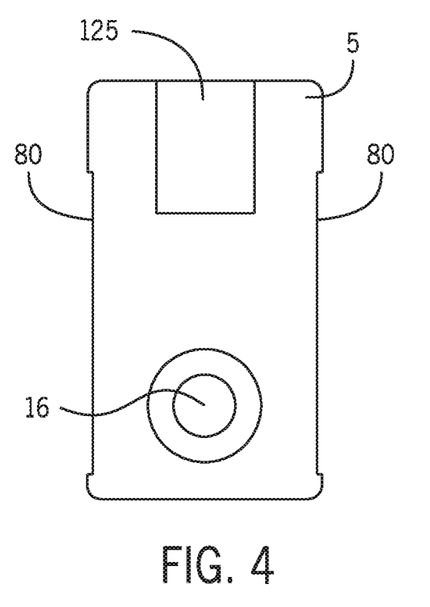
FIG. 4 illustrates a view of the back of the housing in an embodiment (with the handle removed).
Figure 5:
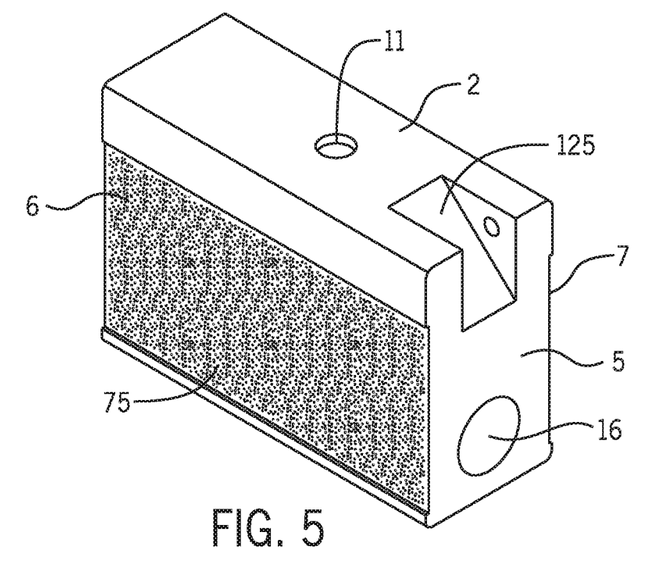
FIG. 5 illustrates a perspective view of the housing in an embodiment (with the handle removed).
Figure 6:
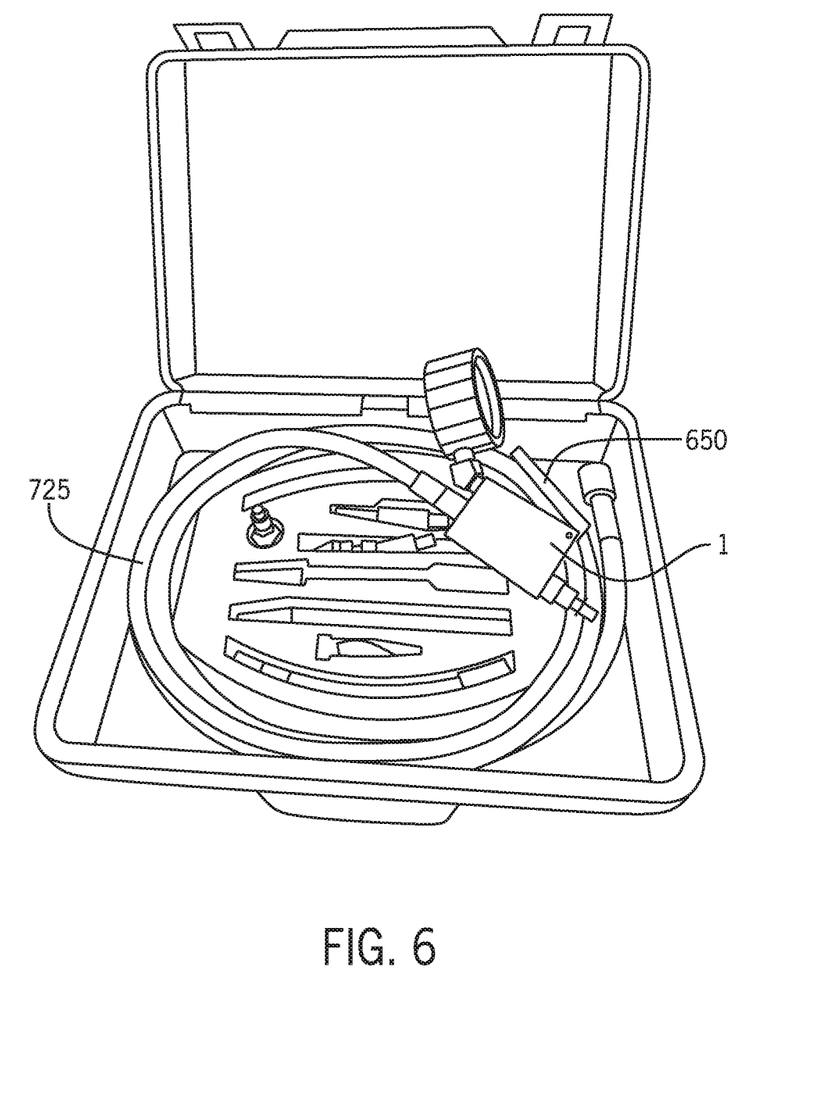
FIG. 6 illustrates a perspective view of the device, including accompanying components, in a custom configured carrying case.
Figure 10:
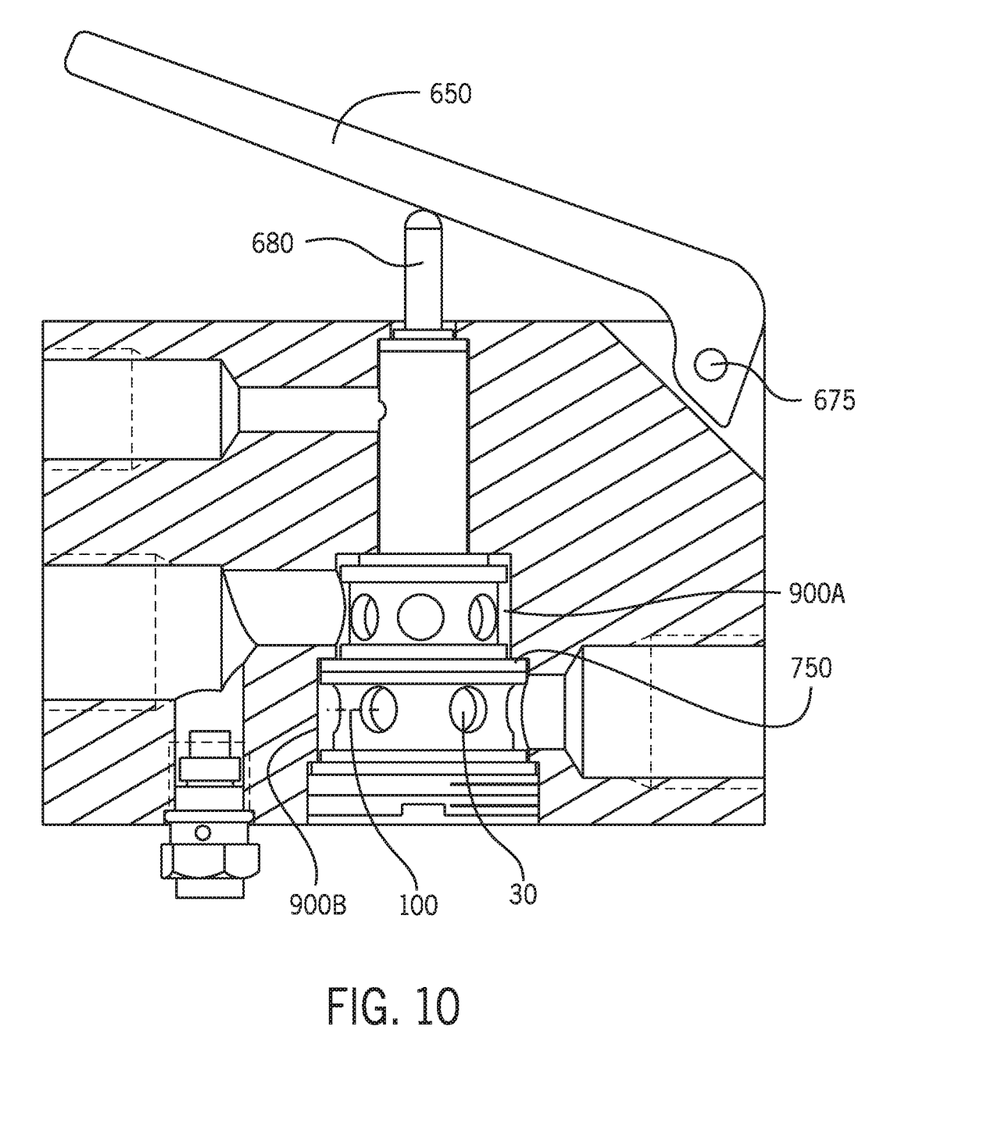
FIG. 10 illustrates the main valve of the housing in an embodiment.

Referring now to FIGS. 4 and 5, in an embodiment, the exterior of the housing 1 may have a textured surface 75 which allows for easy gripping and reduced slipping. The first side 6 and the second side 7 may also be slightly indented 80 so as to be easier to grip the housing 1. The housing 1 may have a triangular-shaped indentation 125 at the top 2 and back 5 of the housing 1. The triangular-shaped indentation 125 may receive a handle 650 (FIG. 10) which may trigger a vertically moving pin 680 so as to allow a user to control the flow of air 100. The handle 650 may pivot at a pin 675 (FIG. 10).

In an embodiment, the housing 1 may have a reverse air flow valve 550 (FIG. 9) which is secured within the fourth opening 14. When pressed, the reverse air flow valve 550 allows air 100 to escape the housing 1 at the fourth opening 14. Air 100 exiting through the reverse air flow valve 550 originates from the tire 800. As a result, a user may easily deflate a tire 800 by pressing a button on the housing 1.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A high flow air coupling device comprising:
 a housing having a top, a bottom, a front, a back, a first side, a second side and an interior;
 a valve having a plurality of tiers having different diameters located within the interior of the housing wherein air flows through the valve;
 a plurality of holes on at least two of the plurality of tiers of the valve wherein the plurality of holes on the plurality of tiers allows air flow to pass from within the valve to outside the valve;
 an opening on the housing wherein air passing from within the valve passes out of the opening of the housing and through a tube to a tire;
 a flat screw secured within an opening of the housing wherein the flat screw secures the valve within the interior of the housing and wherein the flat screw does not inhibit the flow of air within the housing;

wherein the diameters of the plurality of tiers increases the closer a tier is to the bottom of the housing; and a movable handle secured to a pin wherein the movable handle controls the flow of air within the housing.

2. The high flow air coupling device of claim 1 further comprising:

a second opening on the housing wherein the second opening has a reverse air flow valve secured to the second opening.

3. The high flow air coupling device of claim 1 further comprising:

a gasket located between at least two of the plurality of tiers of the valve.

4. The high flow air coupling device of claim 3 further comprising:

a plurality of sealed chambers located within the interior of the housing wherein the plurality of sealed chambers is separated by the gasket with prevents air flow between the plurality of sealed chambers.

\* \* \* \* \*